United States Patent
Ady et al.

(10) Patent No.: US 9,274,685 B2
(45) Date of Patent: Mar. 1, 2016

(54) SYSTEMS AND METHODS FOR PREDICTIVE TEXT ENTRY FOR SMALL-SCREEN DEVICES WITH TOUCH-BASED TWO-STAGE TEXT INPUT

(71) Applicant: Motorola Mobility LLC, Libertyville, IL (US)

(72) Inventors: Roger W Ady, Chicago, IL (US); Hui Dai, Northbrook, IL (US); Jeong J Ma, Woodbury, MN (US)

(73) Assignee: Google Technology Holdings LLC, Mountain View, CA (US)

(*) Notice: Subject to any disclaimer, the term of this patent is extended or adjusted under 35 U.S.C. 154(b) by 200 days.

(21) Appl. No.: 13/833,904

(22) Filed: Mar. 15, 2013

(65) Prior Publication Data

US 2014/0282211 A1 Sep. 18, 2014

(51) Int. Cl.
*G06F 3/048* (2013.01)
*G06F 3/0484* (2013.01)
(Continued)

(52) U.S. Cl.
CPC ............ *G06F 3/0484* (2013.01); *G06F 3/0236* (2013.01); *G06F 3/0237* (2013.01); *G06F 3/04886* (2013.01)

(58) Field of Classification Search
CPC .... G06F 3/0237; G06F 3/0481; G06F 17/234
USPC ........................................................ 715/780
See application file for complete search history.

(56) References Cited

U.S. PATENT DOCUMENTS 5,812,117 A * 9/1998 Moon ........................... 345/169
5,956,021 A    9/1999 Kubota et al.
6,169,538 B1   1/2001 Nowlan et al.
(Continued)

FOREIGN PATENT DOCUMENTS

EP    2395415 A2    12/2011
WO    03098417 A2    11/2003
(Continued)

OTHER PUBLICATIONS

Patent Cooperation Treaty, "PCT Search Report and Written Opinion of the International Searching Authority" for International Application No. PCT/US2013/054660, Dec. 5, 2013, 8 pages.
(Continued)

*Primary Examiner* — Andrew Tank
*Assistant Examiner* — Jian Yu
(74) *Attorney, Agent, or Firm* — Shumaker & Sieffert, P.A.

(57) ABSTRACT

Embodiments relate to systems and methods for predictive text entry for small touch-screen devices. A two-state input interface (116) of a device (102) can include a seek area (120), which displays a subset of letters representing the full range of available letters. The user can select a first letter in that subset. A prediction engine (160) can generate a next most-likely letter (162) based on the currently inputted letter, using look-up tables or other techniques based on letter sequence probabilities. The user can respond with a right or left-swipe gesture, causing the prediction engine (160) to seek the most-likely next letter upstream or downstream in the alphabet. The user can also respond by touching the seek area causing the prediction engine (160) to seek the next predicted letter closest to the touch point. The prediction engine (160) can also generate a predicted completed word, for convenient user selection.

13 Claims, 18 Drawing Sheets

(51) Int. Cl.
*G06F 3/023* (2006.01)
*G06F 3/0488* (2013.01)

(56) References Cited

U.S. PATENT DOCUMENTS

| | | | |
|---|---|---|---|
| 6,310,634 | B1 | 10/2001 | Bodnar et al. |
| 7,190,351 | B1 | 3/2007 | Goren |
| 7,336,263 | B2 | 2/2008 | Valikangas |
| 7,760,187 | B2 | 7/2010 | Kennedy |
| 8,117,540 | B2 | 2/2012 | Assadollahi |
| 2003/0179185 | A1* | 9/2003 | Iwamura et al. ............... 345/168 |
| 2003/0193478 | A1* | 10/2003 | Ng et al. ........................ 345/168 |
| 2004/0070567 | A1* | 4/2004 | Longe et al. .................. 345/156 |
| 2005/0270270 | A1 | 12/2005 | Chadha |
| 2006/0217144 | A1* | 9/2006 | Bonnelykke Kristensen et al. .......................... 455/550.1 |
| 2007/0046641 | A1* | 3/2007 | Lim ................ 345/173 |
| 2007/0262956 | A1 | 11/2007 | Chen |
| 2008/0174570 | A1 | 7/2008 | Jobs et al. |
| 2009/0040184 | A9* | 2/2009 | Pu et al. ........................ 345/171 |
| 2009/0058823 | A1 | 3/2009 | Kocienda |
| 2010/0026650 | A1* | 2/2010 | Srivastava et al. ............ 345/173 |
| 2010/0066764 | A1 | 3/2010 | Refai |
| 2010/0225599 | A1* | 9/2010 | Danielsson et al. .......... 345/173 |
| 2011/0185306 | A1 | 7/2011 | Aravamudan |
| 2011/0246943 | A1 | 10/2011 | Fujibayashi |
| 2011/0304555 | A1* | 12/2011 | Murphy ....................... 345/169 |
| 2011/0320978 | A1 | 12/2011 | Horodezky et al. |
| 2012/0019540 | A1 | 1/2012 | Yaksick et al. |
| 2012/0081305 | A1* | 4/2012 | Schrock ....................... 345/173 |
| 2012/0223889 | A1 | 9/2012 | Medlock et al. |
| 2013/0246329 | A1* | 9/2013 | Pasquero et al. ............... 706/52 |
| 2014/0015753 | A1* | 1/2014 | Pai ................................ 345/168 |
| 2014/0049477 | A1 | 2/2014 | Dai et al. |

FOREIGN PATENT DOCUMENTS

| | | |
|---|---|---|
| WO | 2004100510 A1 | 11/2004 |
| WO | 2007047188 A2 | 4/2007 |

OTHER PUBLICATIONS

Hui Dai et al., "Systems and Methods for Touch-Based Two-Stage Text Input", U.S. Appl. No. 13/584,966, filed Aug. 14, 2012, 45 pages.

Mark D. Dunlop and Michelle Montgomery Masters, "Investigating five key predictive text entry with combined distance and keystroke modelling", http://dl.acm.org/citation.cfm?id=1416968&bnc=1, Aug. 10, 2007, pp. 1-21.

Scott MacKenzie et al., "LetterWise: Prefix-based Disambiguation for Mobile Text Input", http://dl.acm.org/citation.cfm?id=502365&bnc<1, 14th Annual ACM Symposium on User Interface Software and Tech., Nov. 2001, pp. 111-120.

Jun Gong et al., "An Enhanced Multitap Text Entry Method with Predictive Next-Letter Highlighting", http://dl.acm.org/citation.cfm?id=1056926&bnc=1, Conference on Human Factors in Computing Systems, Apr. 2005; pp. 1399-1402.

Wikipedia, "Predictive Text", http://en.wikipedia.org/wiki/Predictive_text, printed Nov. 19, 2012, 1 page.

Asela Gunawardana, "Usability Guided Key-Target Resizing for Soft Keyboards", Int'l Conf. on Intelligent User Interfaces 2010, Feb. 2010, pp. 111-118.

International Preliminary Report on Patentability from International Application No. PCT/US2013/076972, mailed Sep. 24, 2015, 7 pp.

* cited by examiner

SYSTEMS AND METHODS FOR PREDICTIVE TEXT ENTRY FOR SMALL-SCREEN DEVICES WITH TOUCH-BASED TWO-STAGE TEXT INPUT

FIELD

The present disclosure relate to systems and methods for predictive text entry for small touch-screen devices. The predicted text may include alphanumeric characters such as letters, numbers, punctuation, or other symbols.

BACKGROUND

In the field of portable communication services, manufacturers have built ever-more capable wireless devices into increasingly compact form factors. Some wireless devices include a liquid crystal display (LCD) touch screen or other interactive display components that occupy a comparatively small area. For example the MOTOACTV™ fitness tracker has a touch screen size of 1.6 inches (40.64 mm) with a resolution of 176×220 pixels. One of the challenges in bringing a high-function, small-screen electronic device, such as a watch or other wearable electronic device, to market is the fact that the limited screen area makes it difficult to display a full range of data entry characters in the available touch screen space.

Instead of using a touch screen, some devices use up/down buttons to scroll through an alphabet and select characters for text entry. When a desired letter is displayed, an enter button can be used to select that letter. Of course, a touch screen can be used to implement virtual scroll and select buttons in a similar fashion. This type of text entry mechanism, however, may be cumbersome and frustrating to the user, because it can potentially require very long scrolling actions to arrive at a letter or other symbol the user wishes to enter into a messaging, dialing, or other program.

DESCRIPTION OF DRAWINGS

The accompanying drawings, which are incorporated in and constitute a part of this specification, illustrate embodiments of the present disclosure and together with the description, serve to explain the principles of the present disclosure. In the figures.

Figure 1:
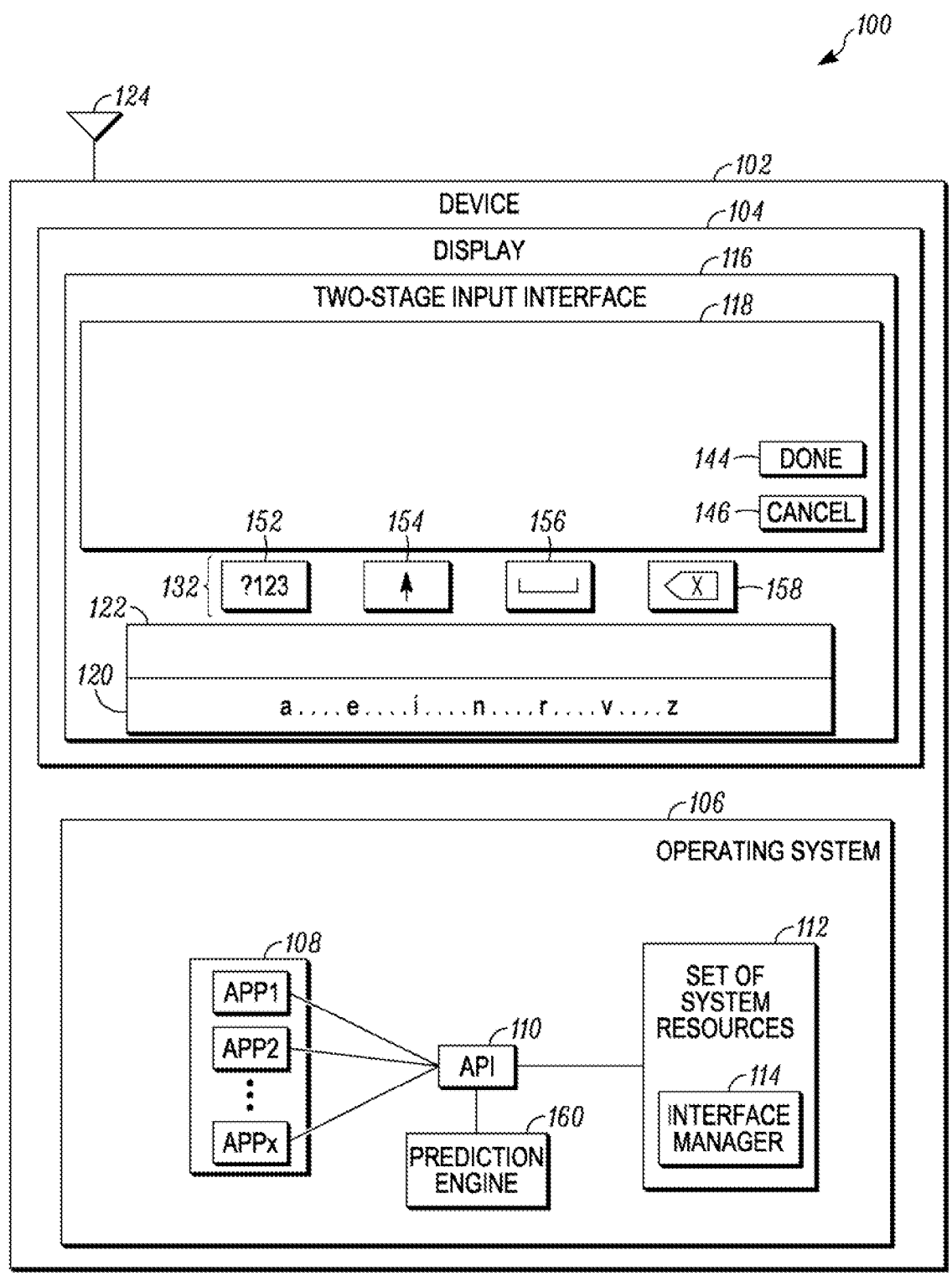
FIG. 1 illustrates an overall environment in which systems and methods for predictive text entry for small-screen devices can be incorporated into an electronic device, according to various implementations.

Skilled artisans will appreciate that elements in the figures are illustrated for simplicity and clarity and have not necessarily been drawn to scale. For example, the dimensions of many of the elements in the figures may be exaggerated relative to other elements to help to improve understanding of embodiments.

DESCRIPTION OF EMBODIMENTS

Embodiments of the present disclosure relate to systems and methods for predictive text entry for small touch-screen devices. These concepts were originally developed for a compact mobile electronic device having a touch screen size of 1.6 inches (40.64 mm) with a resolution of 176×220 pixels, but it will be appreciated that these ideas can be implemented in electronic devices of other sizes including those with both larger and smaller touch screens. More particularly, embodiments relate to platforms and techniques including a two-stage interface for receiving user input on a touch screen device, in which the user can be presented with a seek bar or area which represents the entire range of letters, characters, numbers, and/or other symbolic information in a compressed format.

For example, in a seek bar that presents the entire range of the letters of the English alphabet, the seek bar may present every other letter, for a total of 13 displayed letters, or can present other subsets of the full range of available letters. The user can touch the display at a first point in the seek bar near the area of a letter the user desires to select and touch a point, for example, at or near the letter "m" in the seek bar. In some implementations, a selection bar or area, as a second graphical interface element, can then be generated and/or updated based on the user's touch at the first point. The selection bar is configured to display the letters surrounding the first point touched on the seek bar. Thus, in the case of the user touching a first point at or near the letter "m" on the seek bar, the selection bar or area can present the user with the individual letters "k l m n o," or shorter or longer sets of the letters surrounding the letter "m" in the alphabet (assuming a linear representation of the alphabet). The user can then slide the finger from the first point to touch a second point, for example, the letter "n" displayed in the selection bar, if that is the letter the user wishes to select as input. Upon lifting off that second point, and/or by other user actions, the selected letter "n" can then be inputted to a text editing box or other dialogue.

The user can then repeat the process of targeting a range for, and then selecting, individual letters or other symbolic elements, until the user completes a desired input string. The user can select or activate a "done" button or other control, when the message is composed or completed, to send the text string to an application and/or other software or service, such as a messaging or dialing application. In various aspects, the activity of entering text, character, numeric, and/or other types of symbolic information can be facilitated for a user operating an electronic device having a comparatively small touch screen, including those that do not easily support the display of full or unabbreviated character sets in the available screen area and selection of one character from the full character set in a single-stage manner.

In addition, according to implementations herein, the host device can incorporate a prediction engine and other logic and associated resources to generate the most-likely next letter or letters to follow text selections the user has already made on the two-stage input interface. By snapping or locating the target range of the alphabet to sections that include the most likely next letter(s) identified by the prediction engine, ease of navigation can be further increased and efficiency of input operations can be enhanced.

Reference will now be made in detail to exemplary embodiments of the present disclosure, which are illustrated in the accompanying drawings. Where possible the same reference numbers will be used throughout the drawings to refer to the same or like parts.

FIG. 1 illustrates an overall environment 100 including an electronic device 102 incorporating various aspects of systems and methods for predictive text entry for small touch-screen devices. The electronic device 102 can include a network-enabled communication component, such as, for example, a cellular (3GPP, 3GPP2, LTE) transceiver, a WiFi (IEEE 802.11) transceiver, a WiMAX (IEEE 802.16) transceiver, a Bluetooth (IEEE 802.16) transceiver, an infrared transceiver, and/or other standardized or proprietary communication transceivers and communication buses (such as Ethernet and USB). With such a transceiver, the electronic device 102 can support voice and/or data communications and thus may include a dialing (e.g., telephony) application, a messaging (e.g., email, text messaging, instant messaging) application, a digital audio (e.g., MP3) player application, and/or a data synchronization application.

The electronic device 102 can have a small form-factor such as a watch-style device, an arm-band device, a belt-style device, or a head-set device. As shown, the electronic device 102 can host or incorporate a number of hardware, software, and/or other resources, including a display 104 and an operating system 106.

The display 104 can be or include a light-emitting diode (LED), organic light-emitting diode (OLED), or liquid crystal display (LCD), and/or displays having other types of panels or illumination elements. In some implementations, the display 104 can incorporate hardware-based input components, such as, for example, a capacitive or resistive touch-sensitive panel allowing the user to enter data based on touch-points or other actions on the screen. As noted, the electronic device 102 can be configured in a comparatively small form factor, but the touch screen or display screen may be larger for low-vision applications or other use cases. It may be noted that the electronic device 102 can incorporate other input and output devices, such as, for example, audio output via a speaker, and/or audio input via a microphone, and/or control input via mechanical buttons or switches.

As shown, the electronic device 102 can host or incorporate further hardware, software, and/or other services or resources to provide an overall framework for operating the electronic device 102 and conducting input, communications, and/or other activity. The resources of the electronic device 102 can include, for example, an operating system 106 installed on the electronic device 102 and controlling the data storage, processing, communications, and/or other resources of the electronic device 102 and/or accessed via the electronic device 102. As shown, the electronic device 102 can host a set of applications 108 running through the operating system 106. The set of applications 108 can be or include one or more applications and/or other software, services, and/or routines such as telephony applications, messaging applications including texting, instant messaging, and/or email applications, word processing applications, spreadsheet applications, database applications, social networking applications, digital audio/video player applications, and/or others.

The set of applications 108 can access any one or more of a set of system resources 112 hosted by or incorporated in the electronic device 102 via an application programming interface (API) 110, and/or other interface, channel, bus, and/or connection. The set of system resources 112 can include various hardware, software, and/or other services, logic, or resources such as electronic memory, local storage such as disk-based, optical, and/or electronic storage, communications resources such as ports, transmission hardware, and/or a set of antennas 124 to permit wireless network operations, such as connection to the Internet and/or other public or private networks, such as by cellular telephone wireless data packets, WiFi™ connections or sessions, and/or others.

The set of antennas 124 can be or include a single antenna or a set of multiple antennas for diversity and/or other purposes. The set of antennas 124 can be mounted externally to the electronic device 102 (as shown), and/or can be mounted internally within the electronic device 102, and/or can be mounted in other configurations. The set of system resources 112 can include an interface manager 114, which can be a set of routines, logic, services, and/or other resources executing and/or supporting the processing of input to and/or output from the electronic device 102, including a two-stage text input interface 116 generated and presented on the display 104. According to some implementations, the interface manager 114 and/or associated logic can be implemented as a self-running system application, service, and/or other resource that handles text input and editing operations, and/or operations on other symbolic elements.

In some implementations, the interface manager 114 may not report every entered letter or other symbolic element back to the calling application, upon completion of the entry of each individual symbolic element. Instead, the interface manager 114 may only report a completed string after a user indicates that the complete string has been entered by touching a "done" virtual button 144 on the touch screen. The two-stage text input interface 116 can incorporate a number of dialogues, selection buttons or boxes, and/or other interface features to permit the user of device 102 to enter textual and/or other symbolic information into the electronic device 102, despite a comparatively limited viewing area on display 104. Those interface objects can for instance include a "cancel" button 146. While the "done" virtual button 144 and "cancel" button 146 are illustrated as virtual buttons, in implementations, those buttons and any other of the buttons, keys, objects, or switches may be mechanical or virtual.

As shown, the two-stage text input interface 116 can include a view and/or display area on the display 104 with a selection component, such as a capacitive or resistive touch panel, in which the user of electronic device 102 can input various data and perform other operations. In various aspects, the user can operate the two-stage text input interface 116 to control a seek area 120 from which the user can access or enter a selection area to view and enter elements from a subset of a set of symbolic elements 148 (shown, e.g., in FIGS. 3-6). The seek area 120 can be configured in a linear (or bar) format, in a two-dimensional format, and/or in other formats or arrangements. The set of symbolic elements 148 can include any type of symbolic data, characters, and/or elements, such as, for example, an alphabet in English and/or other languages, a set of numbers and/or other numeric information, a set of symbols, such as, for example, commas, periods, parenthesis, and/or other typing or grammatical symbols, mathematical symbols, icons or other graphical information, keyboard or telephone keypad symbols, and/or other characters, data, or information.

In certain implementations, the set of symbolic elements 148 and/or other characters, figures, marks, and/or information is too long and/or occupies too much screen area to fit into the seek area 120 of the display 104, while in other implementations, the set of symbolic elements 148 and/or other characters, figures, marks, and/or information may be represented in full form on the display 104. The set of symbolic elements 148 can be displayed in abbreviated format by, for example, showing only every Nth letter of the set (where N>=2) or by showing only representative elements of the set (e.g., one happy face for a range of positive expression icons and one sad face for a range of negative expression icons).

As shown, the two-stage text input interface 116 can include a set of controls 132 to operate the two-stage text input interface 116 and to select various input processing or other actions, such as to select, navigate, underline, and/or delete letters or other symbolic information, among others, according to platforms and techniques described herein. The set of controls 132 shown include a number of virtual buttons with icons to activate various controls or actions. Of course, the controls 132 could be implemented as mechanical buttons, voice control instructions, gesture-based motions of the electronic device (e.g., as supported by a gyroscope or accelerometer) or a combination of virtual button, mechanical button, voice control, or motion-based inputs.

For example, the set of controls 132 includes a "selection" virtual button 152 that can be activated to switch between different sets of symbolic elements, such as letter sets, character sets, symbol sets, icon sets, and/or others. An upper/lower case (or "shift") virtual button 154 can be activated to switch between lowercase and uppercase formats for the symbolic elements. A "space" virtual button 156 can be activated to insert a blank space in the text editing box 118 and/or other dialogue entry area. A "delete" virtual button 158 can be activated to delete or remove a selected symbolic element or elements from the text editing box 118 and/or other dialogue entry area. It will again be appreciated that while four specific, virtual buttons are shown in the illustrated set of controls 132, other amounts, types, layouts, and configurations of buttons, switches, keys, and/or other icons or controls can be used, including mechanical versions of those elements.

During operation, the two-stage text input interface 116 can generate and/or display the seek area 120 to present a comparatively compact, abbreviated, filtered, truncated, and/or otherwise reduced representation of the set of symbolic elements 148. For example, the seek area 120 can display a set of sampled letters taken from the complete English alphabet, such as "a . . . e . . . l . . . n . . . r . . . v . . . z", as shown, although it will be appreciated that other selections or samplings of letters or other symbolic elements can be used. In some implementations, the reduced and/or otherwise modified representation of the full set of symbolic elements 148 and/or other characters, figures, marks, and/or information shown in the seek area 120 can be regularly separated, sampled, and/or spaced within the ordinal or ordered list or arrangement of the set of symbolic elements 148. Thus, the reduced and/or modified representation of the set of symbolic elements 148 can present every other symbolic element, every third symbolic element, every sixth symbolic element, and/or other ordered arrangements that are spaced apart using other spacing or sampling rules or techniques. As further examples, the reduced representation of the set of symbolic elements 148 and/or other characters, figures, marks, and/or information can be generated using irregular and/or variable spacing, ordering, or separation between the symbolic elements of the set of symbolic elements 148. The reduced or modified representation of the full set of symbolic elements 148 and/or other characters, figures, marks, and/or information presented in the seek area 120 can permit the user to view a depiction of the entire range of the set of symbolic elements 148 available for selection, without necessarily showing every element in the set of symbolic elements 148.

Figure 2:
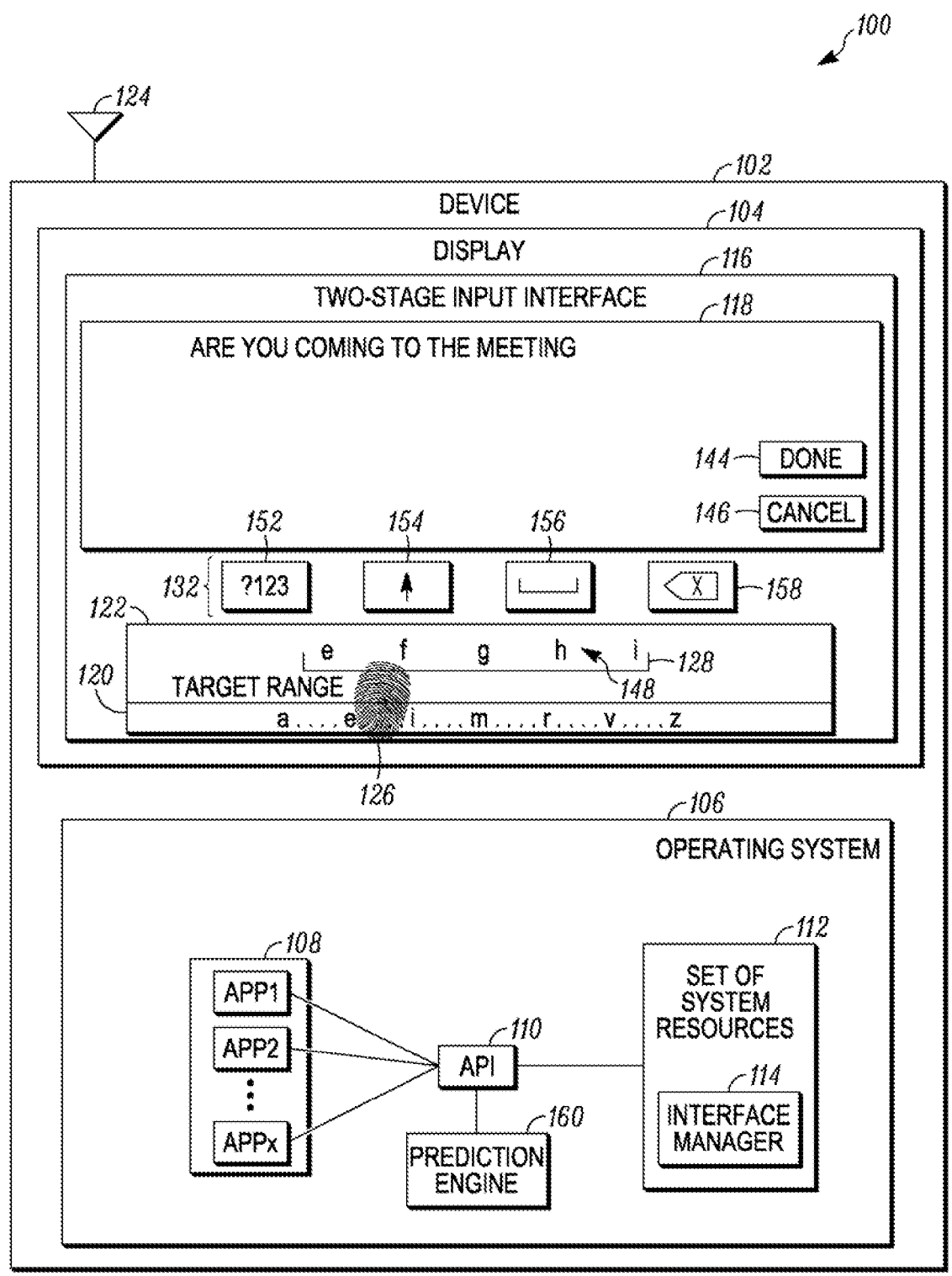
FIG. 2 illustrates input processing activity that can be carried out on a compact mobile communications device using systems and methods for predictive text entry for small-screen devices, according to various implementations incorporating a one-dimensional seek area and a one-dimensional selection area.

According to various implementations, and as shown in FIG. 2, the user can view the reduced or modified representation of the set of symbolic elements 148 in the seek area 120 and touch a first point 126 on a surface of the display 104 on or around a desired letter or other element, to cause a target range 128 of the set of symbolic elements 148 and/or other characters, figures, marks, and/or information to appear in the selection area 122. The target range 128 is a selection or subset from the full set of symbolic elements 148 so that, for example as shown, five letters that might be covered by the touch point on the seek bar can be displayed. Other ranges of symbols surrounding a selected symbol can be used. For example, if representative happy, sad, and neutral emoticons were displayed in the seek area 120, touching the happy emoticon may result in a target range 128 of five different types of happy emoticons to be displayed in the selection area 122.

The target range 128 is a limited subset of the entire set of symbols available for text entry. In some implementations, the selection area 122 can likewise be configured in a linear or bar format, in a two-dimensional or matrix format, and/or in other formats or arrangements. The selection area 122 can include touch-screen input elements so that the user can touch a first point on the seek bar, view in the selection area 122 the target range 128 symbols related to the first touch point, then drag and/or otherwise reposition the finger or a pointing instrument on one element in the target range on the selection bar 122 that the user wishes to select.

Figure 3:
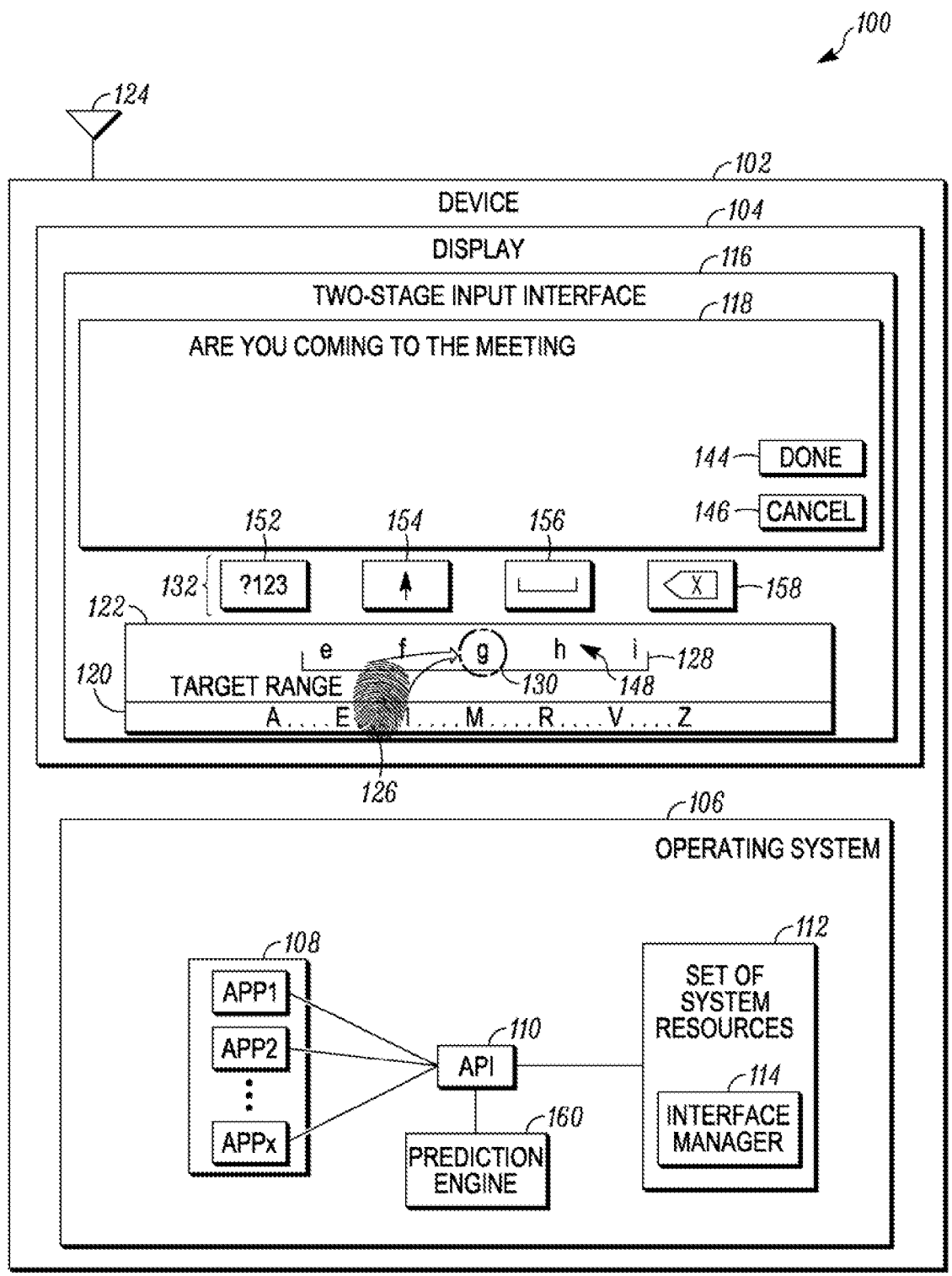
FIG. 3 illustrates input processing activity that can be carried out on an electronic communication device using systems and methods for predictive text entry for small-screen devices, according to various implementations in further regards.

For example, as shown in FIG. 3, after the user has identified and/or selected the letter and/or other symbol the user wishes to input, the selected letter or other symbolic elements can appear in a text editing box 118 and/or other dialogue of the two-stage character input interface 116. The text editing box 118 can, in various implementations, be configured to display a "done" virtual button 144, and/or a "cancel" virtual button 146, as shown, as well as other buttons and associated operations. Of course, the virtual buttons may be replaced by mechanical buttons that perform the same functions. The "done" virtual button 144 can allow the user to indicate the completion of a textual string and/or other input and, for example, initiate the transmission of a message contained in the text editing box 118 to a messaging application in the set of applications 108, dial a telephone number indicated by a string contained in the text editing box 118, search for a song title with a phrase indicated by a string contained in the text editing box 118, or to perform other actions. The "cancel" virtual button 146 can allow the user to cancel and back out of the entry of a textual string and/or other input, for example, to start another message or to take other actions.

The input operation of selecting a character (e.g., letter, number, symbol, icon, etc.) by touching a first touch-point in the seek area 120, followed by touching a second touch-point in the selection area 122 can be accomplished using one continuous and/or uninterrupted motion by the user, who may touch and drag a finger and/or pointing instrument from a first touch-point 126 on the touch screen display 104 to a second touch-point 130 on the touch screen display 104, without lifting the finger or instrument off the surface of display 104.

Alternately, the two touches may be separate, with a lifting of the finger off the surface of the display 104 between the two touches.

Additionally, the first touch-point may be a sequence of touch-points within the seek area 120, with the final touch-point operating to finalize the target range 128 available for selection in the selection area 122. For example, the user touches a first point in the seek area 120 with a finger or pointing instrument and moves the finger continuously along the seek area 120 to cause continuous updating of the target range 128 shown in the selection area 122. If the target range 128 is updated in a smooth, continuous manner, the letters and/or other symbolic elements displayed in the target area 128 may seem to scroll left, right, and/or otherwise, following the moving touch-point on the seek area 120 in a real-time or near real-time manner. Continuing the example, if the user slides the finger off the seek area 120, the target range 128 displayed at the time the finger leaves the seek area 120 is the target range 128 available for selection of a character. The user then may continue the glide motion and touch a second point 130 in the selection area 122. As feedback to the user, a character related to the second point 130 may be highlighted by enlarging that character or changing its color. This may assist the user to select a desired character. When the desired character is touched, a lift off of the finger from a second point 130 in the selection area 122 adds the symbolic element to the text editing box 118.

In those regards and others, the entry of letters or other symbolic elements via the two-stage character input interface 116 can therefore be performed with a single action using one finger or instrument, although the two-stage character input interface 116 can also be configured to accept pauses and/or discontinuities in the user's input contact with the display 104. For example, the user may touch a first point 126 in the seek area 120, lift the finger from the seek area 120 to select a target range 128, touch a second point 130 in the selection area 122, and lift the finger from the selection area 122 to select a character to be entered in the text editing box 118.

According to various implementations, the two-stage character input interface 116 can likewise be configured so that if the user moves a finger and/or pointing instrument all the way to either end of the selection area 122, the target range 128 shown in the selection area 122 can enter a slow-scrolling action or mode, in which one symbolic element emerges at a time. When the desired element appears in this end-of-range slow-scrolling mode, the user can then lift the finger and/or pointing instrument off the desired letter and/or other symbolic element to select that element. Other techniques can be used to present the set of symbolic elements 148 beyond the ends or boundaries of the available target range 128 as initially shown in the selection area 122. Again, the character under the second touch point 130 may be highlighted to indicate the character that will be selected if the finger lifts off from that touch-point.

In another example, if the user touches a first point 126 in the seek area 120 to select a target range 128 and lifts the finger and/or pointing instrument directly off from the seek area 120, the two-stage character input interface 116 can be configured to present the corresponding target range 128 in the selection area 122 for a predetermined amount of time in a "hanging" display fashion. If the user resumes by touching a second touch point 130 in the selection area 122, the letter and/or other symbolic element selected can be highlighted, such as by becoming enlarged and/or changing color. Upon lift off of the finger from the selection area 122, the highlighted symbolic element is entered into the text editing box 118. Alternately, the user may touch another first point in the seek area 120 to select another target range 128 and continue text entry as previously described.

Further, as another example, when a user's finger or pointing instrument does not contact the display 104 for a predetermined time, such as for example 5 seconds, the two-stage character input interface 116 can be configured to return to an initial or default condition and/or position of the set of symbolic elements 148. In some implementations, a default condition in those scenarios presents a target range 128 positioned at or from the middle or center of the set of symbolic elements 148 available from the selection area 122, positioned at or from the first symbol and/or other beginning of the set of symbolic elements 148, positioned at or from the last symbol and/or other end of the symbolic elements 148, and/or positioned at or from a set of most-likely next characters based on any existing text in the text editing box 118. Additional features of the two-stage character input interface 116 can be incorporated in the device 102, including those described in co-pending U.S. application Ser. No. 13/584,966 entitled "Systems and Methods for Touch-Based Two-Stage Text Input," filed Aug. 14, 2012, assigned or under obligation of assignment to the same entity as this application, and which application is incorporated by reference in its entirety herein.

Figure 4A:
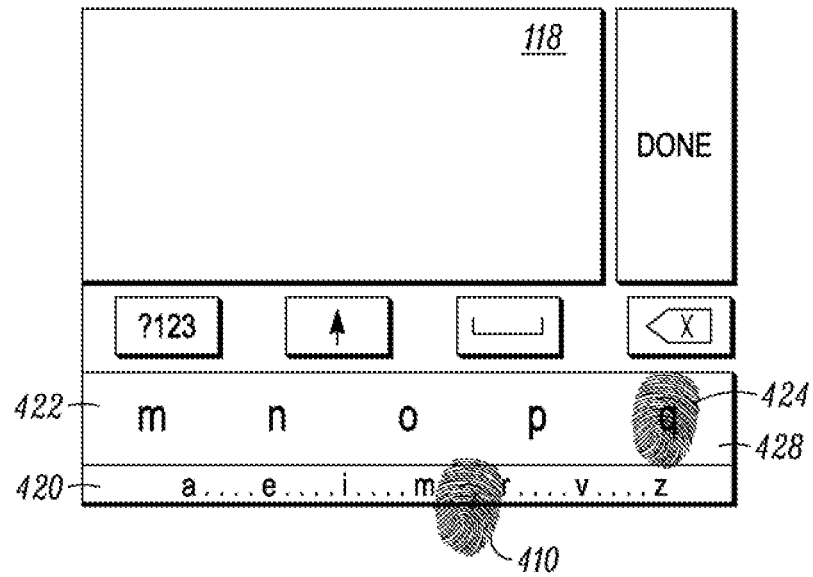
FIGS. 4A-4H illustrate predictive input processing activity that can be carried out on an electronic device using systems and methods for predictive text entry for small-screen devices, according to implementations of the present disclosure.
Figure 4B:
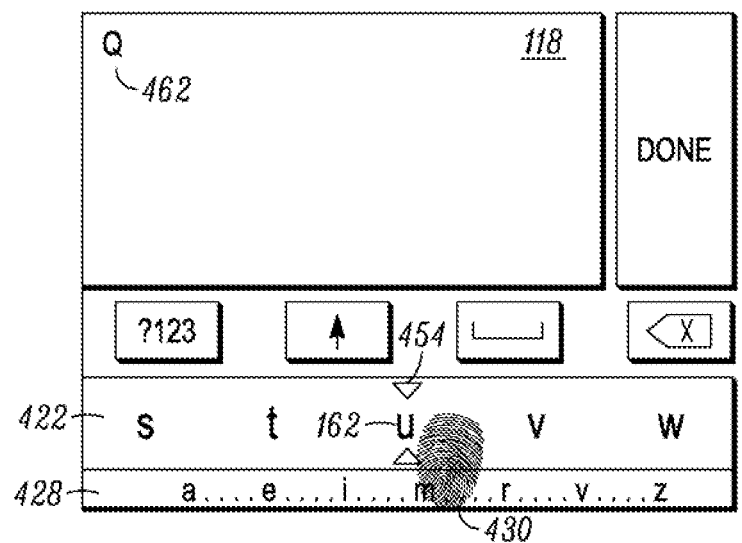

According to implementations, the device 102 can additionally incorporate a prediction engine 160 and associated logic and resources to assist the user with on-the-fly suggestions for selection of a most-likely next letter or letters, based on the text input the user has supplied. In general, the user can supply combinations of input actions including the selection of touch points on the seek area 120 and the performance of touch or swipe gestures on the selection area 122, to traverse the alphabet in desired directions while seeking or including predicted letters or words. As shown in FIG. 4A, a user can start by inputting an initial letter in the text editing box 118. In implementations as shown, that first or initial letter can be inputted by making a first touch point 410 on the lower bar of the seek area 420 to pull up a target range 428 of letters "M" through "Q" in the selection area 422. With that target range 428 displayed, the user can tap or otherwise select "Q" by creating a second touch point 424 on the selection area 422, as shown.

After the user has lifted off the second touch point 424, as shown in 4B, the letter "Q" can be displayed 462 in the text editing box 118. At or around the same time, the prediction engine 160 can detect the entry of the letter "Q," and generate the letter "u" as the predicted next most-likely letter 162. In implementations as shown, the next most-likely letter 162 can be displayed in the center of the selection area 422, for instance with a highlight mark 454 to indicate to the user that letter is the most likely letter to follow the entered "Q." The user can then select the most-likely next letter 162 ("u") by touching a third touch point 430 on that letter in the selection area 422.

Figure 4C:
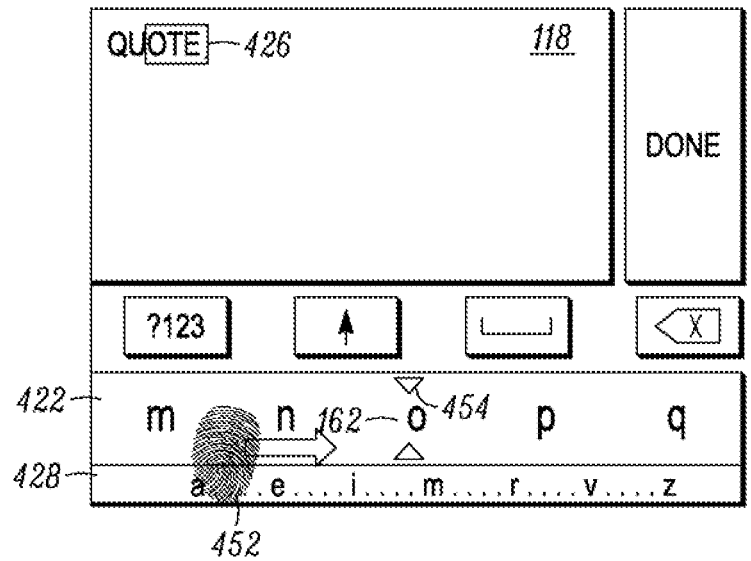

After that action, as shown in FIG. 4C, the text editing box 118 can display the letters "Qu." In implementations as shown, the text editing box 118 can also display a completed whole-word prediction 426, in the illustrated example, the word "Quote," can be generated by the prediction engine 160. In implementations, the two-stage input interface 116 can be configured to accept a touch-point entry or other input on the whole-word prediction 426, to allow the user to proceed directly to entering the predicted whole word, if desired. It will be appreciated, however, that in implementations, a whole-word prediction 426 can be omitted or not be used. In addition to the possible display of the whole-word prediction 426, as shown in FIG. 4C, the prediction engine 160 can generate a further next most-likely letter 162, in this case the letter "o," which is also displayed in the center of the selection area 422 with a highlight mark 454. In the event the user does not wish to enter the next most-likely letter 162 (that is, the letter "o"), the user can as shown in FIG. 4C enter a right-swipe gesture 452 on the selection area 422.

Figure 4D:
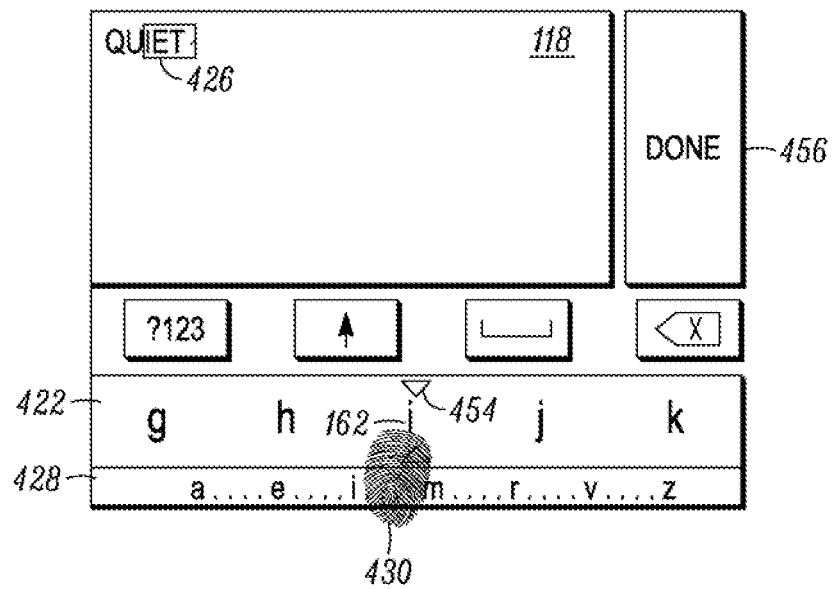

Entry of the right-swipe gesture 452 can cause the prediction engine 160 to determine the next most-likely letter 162 according to the direction of the swipe. In the illustrated example, that letter can be determined to be the letter "l," which, as shown in FIG. 4D, is then displayed as the next most-likely letter 162 on the selection area 422. In addition, in implementations, the prediction engine 160 can also generate a new whole-word prediction 426, which now becomes the word "Quiet" which is displayed in the text editing box 118. The user can again choose to select and enter that word by touching a touch point on that word, or taking other action when a whole-word prediction 426 is presented. In cases as shown, the user can select the next most-likely letter 162 "l" by touching a first touch point 430 on that letter in the selection area, accepting the predicted letter.

Figure 4E:
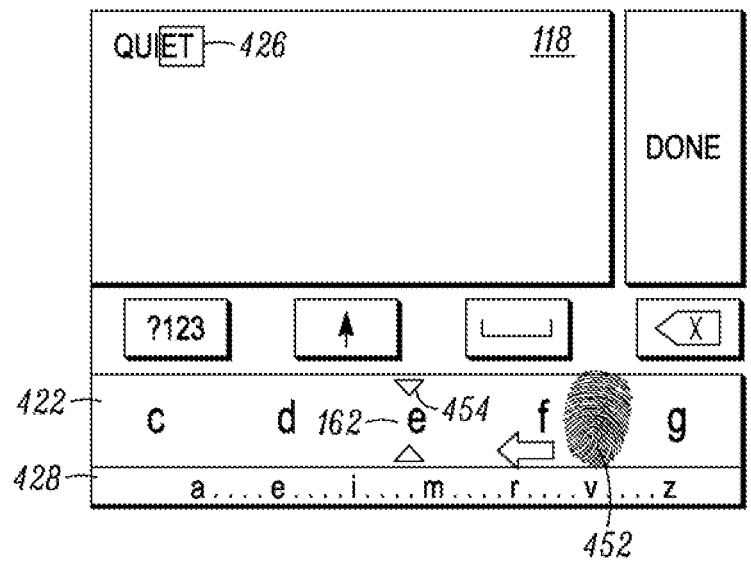

Following that action, as shown in FIG. 4E, the prediction engine 160 can generate an updated or new next most-likely letter 162, which now becomes the letter "e." Again, in implementations the whole-word prediction 426 can be updated to display the word "Quiet," when that feature is used. In cases as shown, the user may choose not to select the next most-likely letter 162 "e," and instead input a left-swipe gesture 452 on the selection area 422, indicating a desire to locate the next most-likely letter in a downstream direction (toward "z") in the alphabet.

Figure 4F:
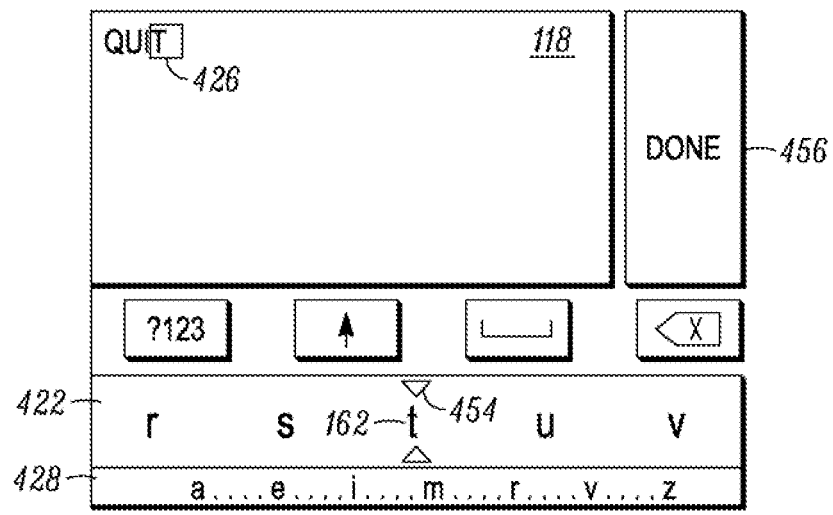
Figure 4G:
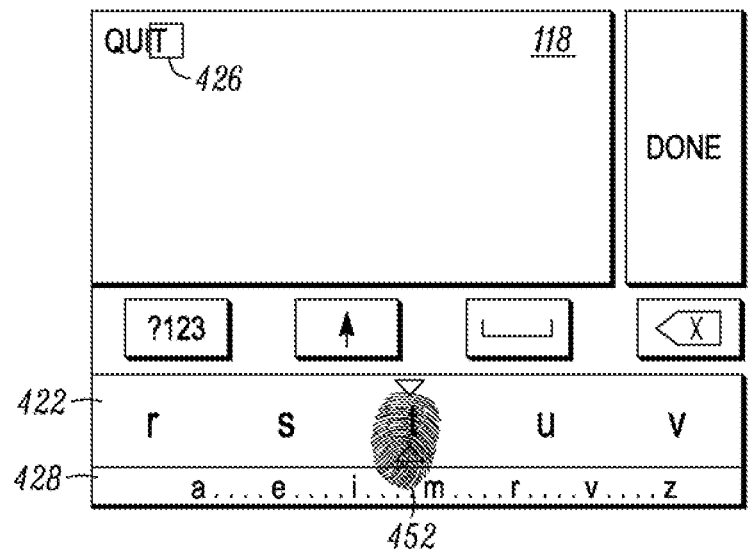
Figure 4H:
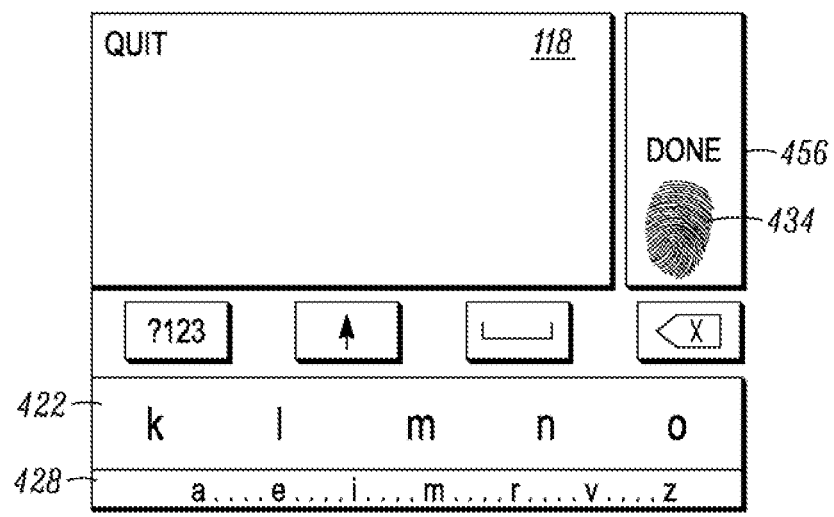

In implementations as shown, this action can result, as shown in FIG. 4F, in the prediction engine 160 generating a new next most-likely letter 162 as the letter "t," which can again be centered in the selection area 422 and highlighted with a highlight mark 454. The whole-word prediction 426 can, if used, likewise be updated to show the word "Quit." The user can then, as shown in FIG. 4G, select the letter "t" by touching a touch point 452 on that letter, after which the user can touch a touch point 434 on the done button 456 as shown in FIG. 4H to accept and enter the word "Quit." In cases, the user can alternatively select the whole-word prediction 426, to enter the word "Quit" directly.

Alternatively, after selection of the letter "i," the user can touch the letter grouping in the seek area denoted with the letter "r." In this case, the prediction engine 160 can likewise cause the letter "t" to be highlighted or marked for selection, as the (still) most-likely next letter 162. As a further alternative, the user can provide a quick swipe gesture left or right to snap to the letters "r" or "v," respectively since those letters could be identified in words that remain a (less likely) possibility, such as "quirk" or "quiver," respectively.

Figure 5A:
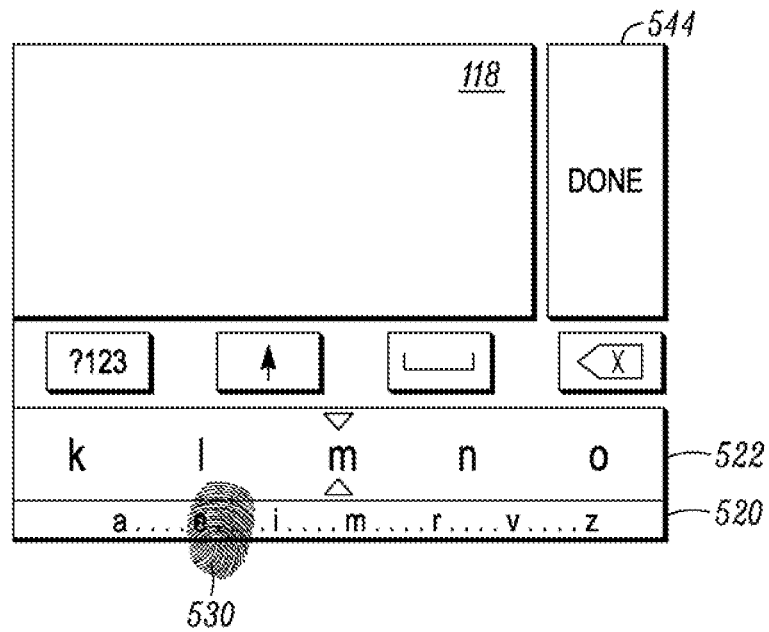
FIGS. 5A-5M illustrate predictive input processing activity that can be carried out on an electronic device using systems and methods for predictive text entry for small-screen devices, according to various further implementations.
Figure 5B:
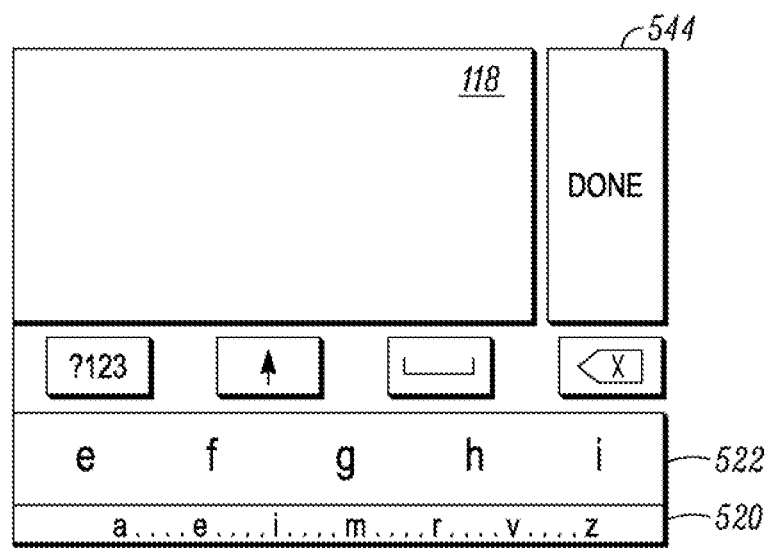
Figure 5C:
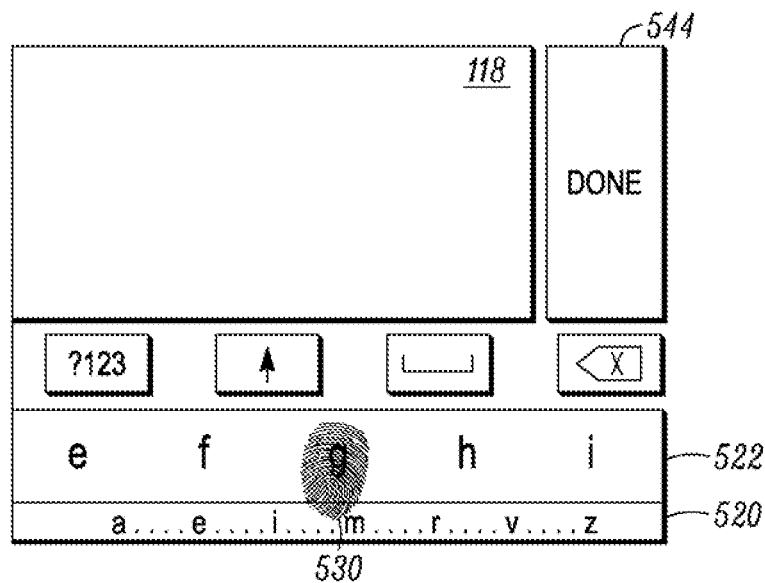

In implementations for instance as shown in FIGS. 5A-5M, further types of predictive processing can be performed, in which manual user input is combined with predictive letter generation. As shown in FIG. 5A, the user can start by entering an initial touch point 530 between "e" and "i" in the seek area 520. The prediction engine 160, in response, can, as shown in FIG. 5B, cause the letters "e f g h i" to be displayed in the selection area 522. The user, as shown in FIG. 5C, can then select the letter "g" by touching a touch point on that letter in the selection area 522.

Figure 5D:
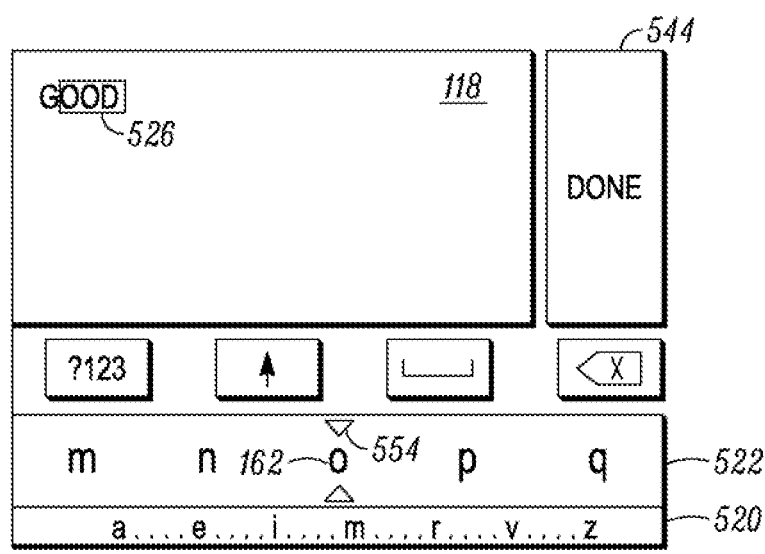
Figure 5E:
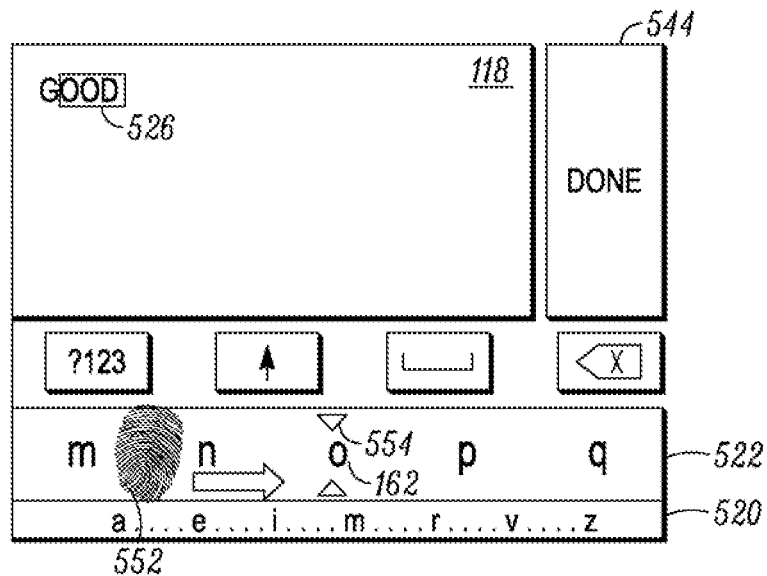

As shown in FIG. 5D, that action can cause the letter "G" (optionally capitalized as the first letter of the new word) in the text editing box 118. Upon detection of that letter, the prediction engine 160 can generate or identify the letter "o", as the next most-likely letter 162. The prediction engine 160 can likewise cause the display of the letter "o" as the next most-likely letter 162 in the selection area 522. The next most-likely letter 162 can, again, be marked or highlighted with a highlight mark 554, such as the illustrated opposing arrows or detents, or other marks. The prediction engine 160 can likewise, again, optionally generate and display the word "Good," as the whole-word prediction 526. After viewing the displayed next most-likely letter 162, as shown in FIG. 5E, the user may choose not to enter the letter "o," and can instead enter a right-swipe gesture 552, indicating a desire to seek a next most-likely letter in an upstream direction (toward "a") of the alphabet.

Figure 5F:
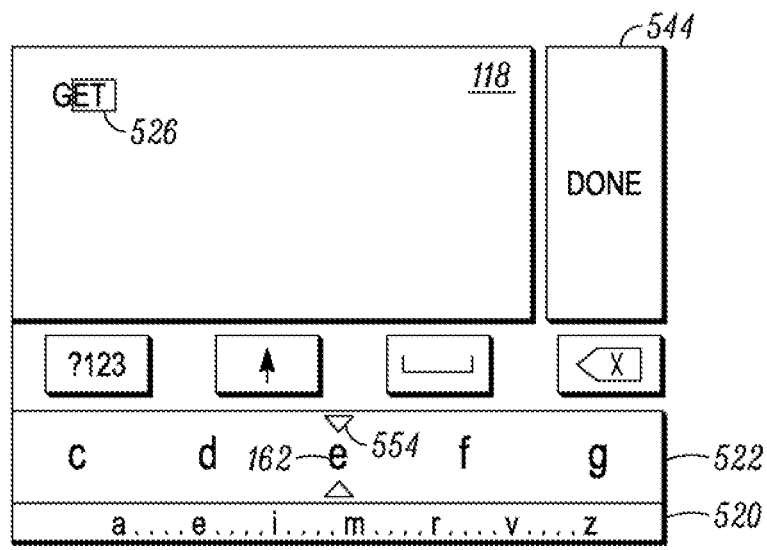

After receipt of the right-swipe gesture 552, as shown in FIG. 5F, the prediction engine 160 can generate or identify the next most-likely letter 162 according to the direction of the gesture, in this case in an upstream direction of the alphabet. That letter can be identified as "e," which is then displayed in the selection area 522 with a highlight mark 554. The prediction engine 160 can also generate, and cause to be displayed, a whole-word prediction 526 in the text editing box 118, which in the illustrated case based on selection of the letter "e" can be the word "Get."

Figure 5G:
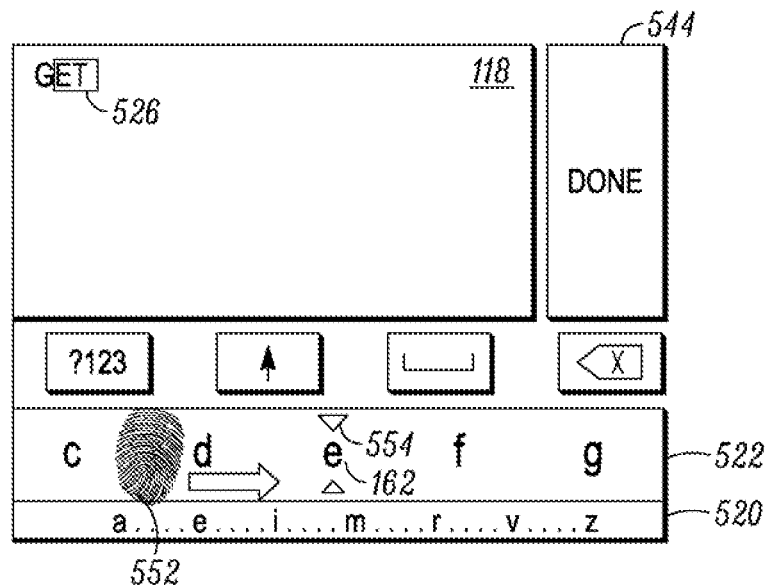
Figure 5H:
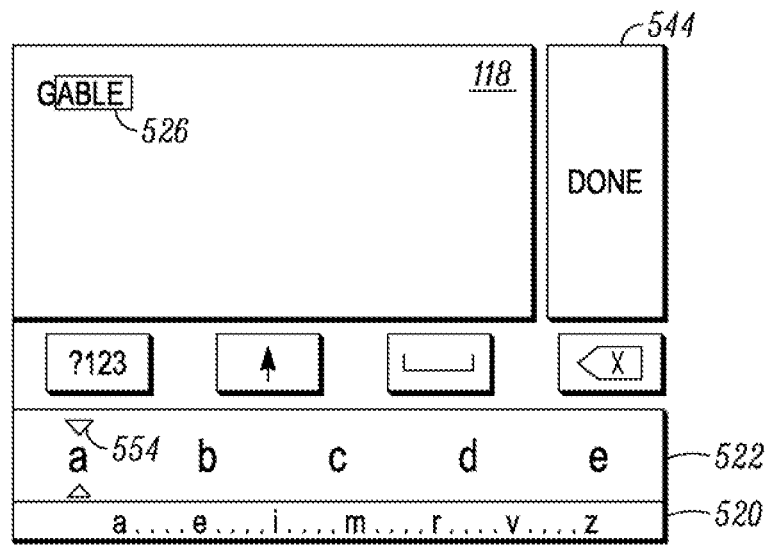

In the event the user chooses not to select the letter "e," the user can, as shown in FIG. 5G, enter a right-swipe gesture 552 on the selection area 522, indicating a desire to travel upstream from that point in the alphabet. As shown in FIG. 5H, the result of that action can be that the prediction engine 160 causes the letters "a b c d e" to be displayed in the selection area 522. In this case, the user has entered a right-swipe gesture 552 while the currently displayed target range 128 is near the beginning of the alphabet, causing the prediction engine 160 to pin the display of letters in the selection area at the beginning of the alphabet, starting with the letter "a." In implementations as shown, the prediction engine 160 can temporarily suspend the display of a next most-likely letter 162, and instead display the letters in sequence at the start of the alphabet, beginning with "a." In aspects as also shown in FIG. 5H, the prediction engine 160 can cause a whole-word prediction 526 to be displayed in the text editing box 118, in this case the word "Gable." This can represent the most likely completed whole word, based on the letters displayed in the selection area 522.

Figure 5I:
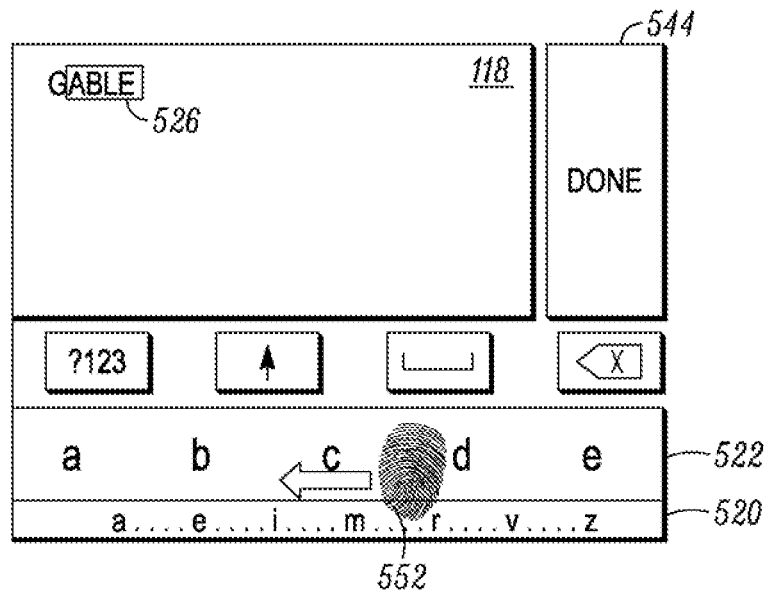
Figure 5J:
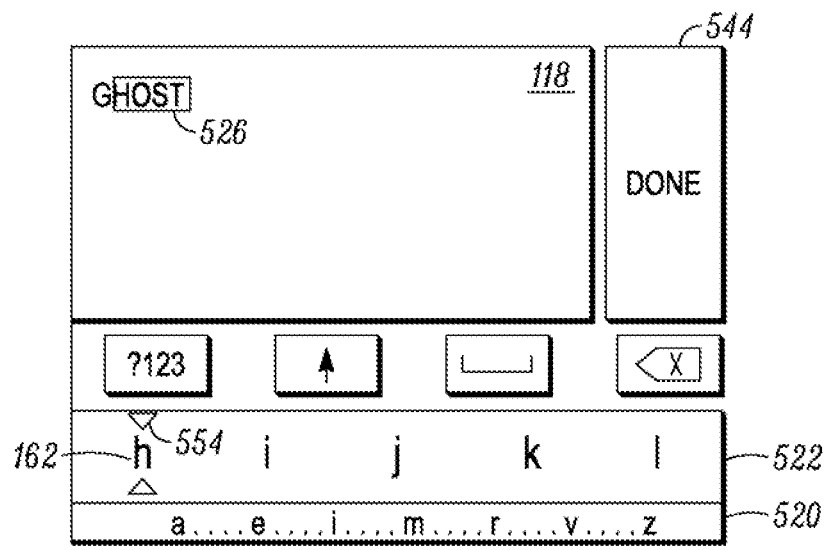

The user can view the selection area 522, and as shown in FIG. 5I, choose to enter a left-swipe gesture on the selection area 522 to indicate a desire to travel downstream in the alphabet, rather than to make a selection of any currently displayed letters. As shown in FIG. 5J, the prediction engine 160 can as a result of that input cause the selection area 522 to display the letters "h i j k l," with a highlight mark 554 on the letter "h" at the beginning of that letter grouping. In this case, the prediction engine 160 can determine that the letter "h" represents the next most-likely letter 162, after excluding letters which were previous presented to the user as possible selections after the current letter, but which were declined. As shown, the letters "f" and "g" had already been presented to the user (FIG. 5G) but were not selected, causing the prediction engine 160 to exclude those letters from the group of letters displayed in the selection area 522. In this scenario, the prediction engine 160 can, as shown, highlight the first letter shown in the (five-letter target range 128), rather than on the center letter ("j"), which does not represent a likely next letter based on prediction algorithms. The prediction engine 160 can also, as shown, generate a whole-word completion 526 represented by "Ghost," based on the letter "h" as the next most-likely letter 162.

Figure 5K:
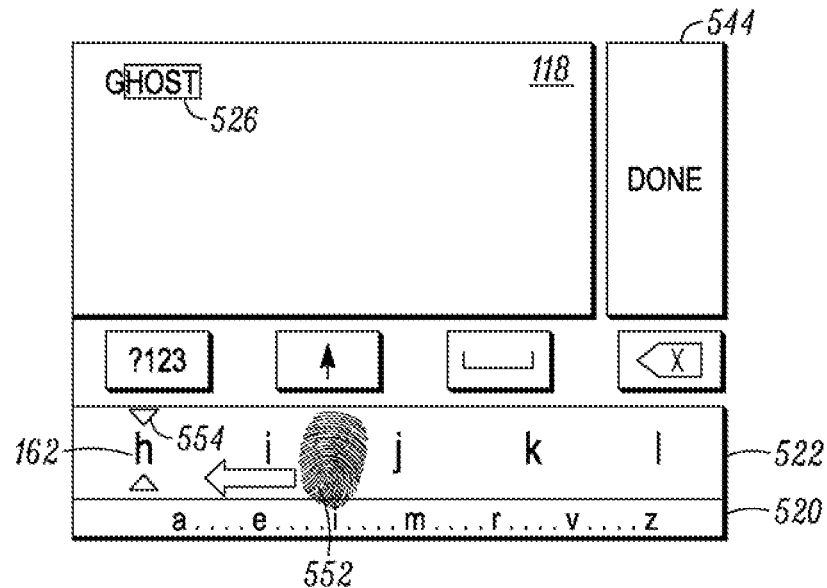
Figure 5L:
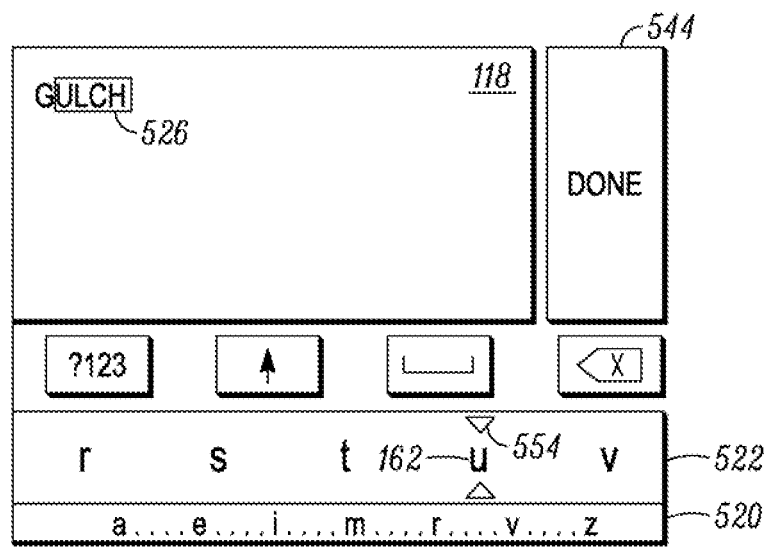

The user can then, as shown in FIG. 5K, choose not to select any of the letters displayed in the selection area 522, and instead input a left-swipe gesture 552 in the selection area 522, indicating a desire to travel downstream in the alphabet from the present point. In this scenario, as shown in FIG. 5L, the prediction engine 160 identifies the letters "r s t u v" for display in the selection area, with the letter "u" selected for presentation as the next most-likely letter 162, marked by a highlight mark 554, at the fourth position in the group of five letters. In this scenario, the prediction engine 160 adjusts its prediction and display logic to locate the letter "u" as the next most-likely letter 162 located in the downstream direction of the alphabet. Here, however, the prediction engine 160 locates a grouping of five letters containing "u" as the most-likely next letter 162, while also presenting other letters which have not yet been displayed to the user after the currently entered letter ("G"). That is, since the letter "q" was previously displayed to the user but not selected (FIGS. 5D, 5E), the prediction engine 160 begins the five-letter grouping containing "u" (next most-likely letter 162) at the letters "r s t," which have not yet been displayed to the user, followed by the letter "v" which has likewise not yet been displayed to the user. In implementations, the prediction engine 160 can update the whole-word prediction 526 to the word "Gulch," if that feature is used.

Figure 5M:
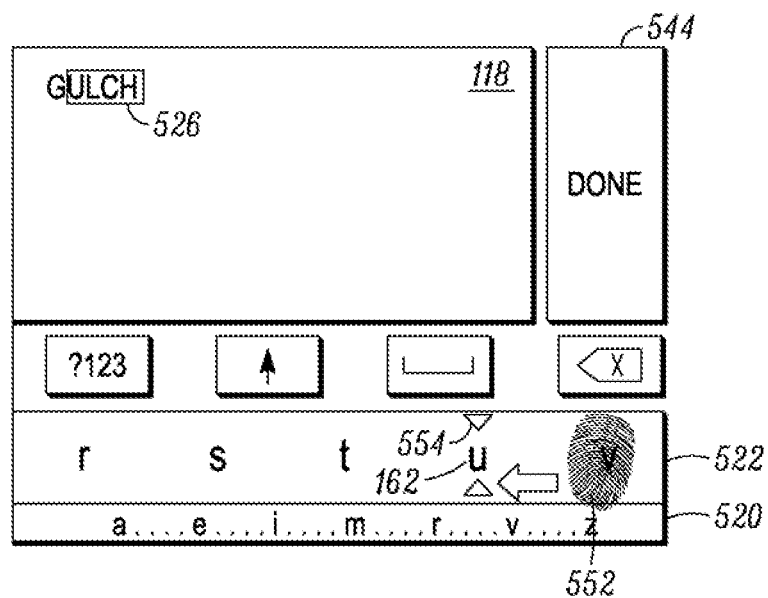

As illustrated in FIG. 5M, the user may then choose not to select the letter "u" as the highlighted next most-likely letter 162, and instead enter a left-swipe gesture 552, indicating a desire to travel downstream in the alphabet. In this case, because the display has neared the end of the alphabet, the prediction engine 160 can cause the letters "v w x y z" to be displayed in the selection area 522 in the next screenshot (not shown), because the remaining letters in that direction have pinned the display to the end of the alphabet. The user can then select one of the displayed letters "v w x y z," touch a touch point in the seek area 520, or take other actions or supply other inputs.

Figure 6A:
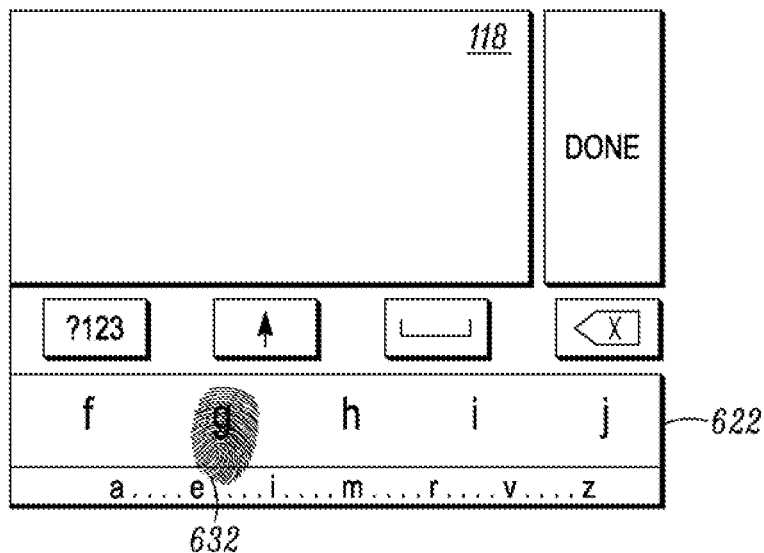
FIGS. 6A-6F illustrate predictive input processing that can be carried out on an electronic device using systems and methods for predictive text entry for small-screen devices, according to various still further implementations.
Figure 6B:
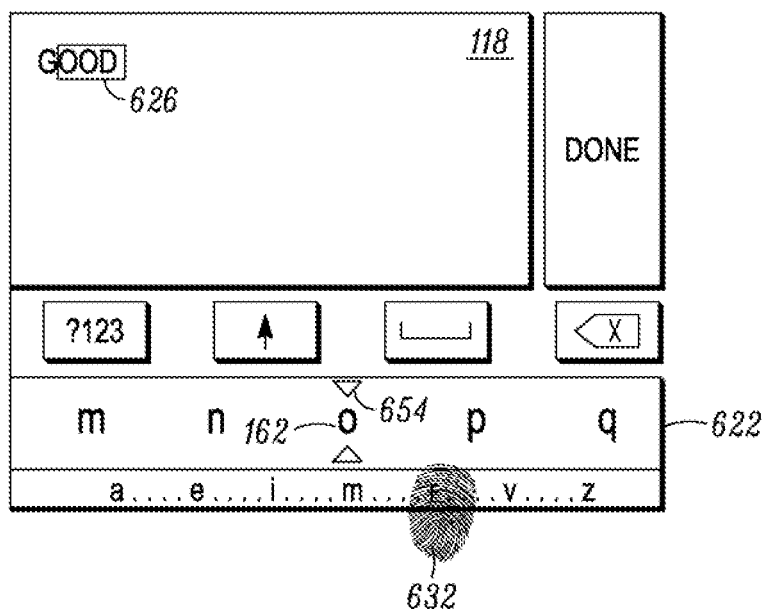

In implementations for instance as shown in FIGS. 6A-6F, further types of predictive processing can be performed in which manual user input is combined with predictive letter generation. As shown in FIG. 6A, a user can begin input processing by selecting the letter "g" by inputting a touch point 632 in the selection area 622. In response to that action, and as shown in FIG. 6B, the prediction engine 160 can cause the letter "G" (again, optionally capitalized as the first letter of a word) to be displayed in the text editing box 118. As also shown, the prediction engine 160 can also cause the word "Good" to be displayed as a whole-word prediction 626 in the text editing box 118, for instance in greyed-out or otherwise highlighted format.

As also shown in FIG. 6B, after the user has selected the letter "G" using a touch point selection, the prediction engine 160 can cause the selection area 622 to display the letters "m n o p q," as the five-letter grouping centered on the letter "o" as the next most-likely letter 162. As in other illustrated implementations, the letter "o" can be marked or highlighted by a highlight mark 654 to indicate to the user that "o" is the most-likely next letter 162, and to make selection of that letter easier or more convenient. In case, the user may, as shown, choose not to select the next most-likely letter 162, and instead enter a touch point 632 on the seek area 620 between the letters "r" and "v".

Figure 6C:
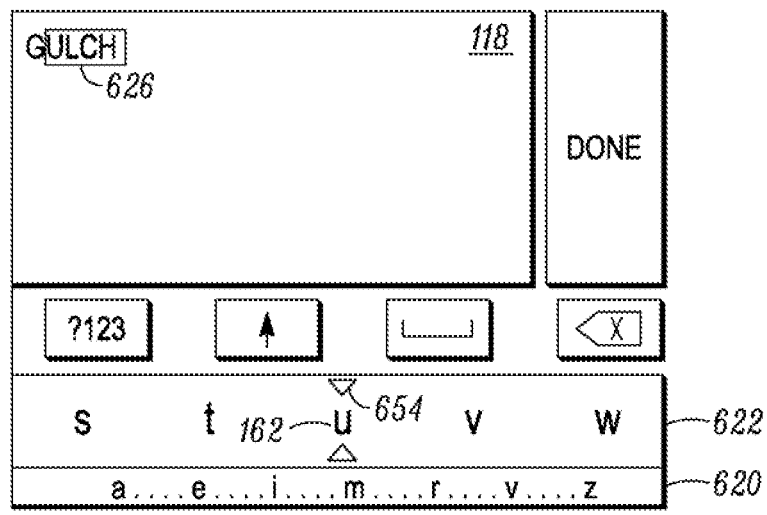
Figure 6D:
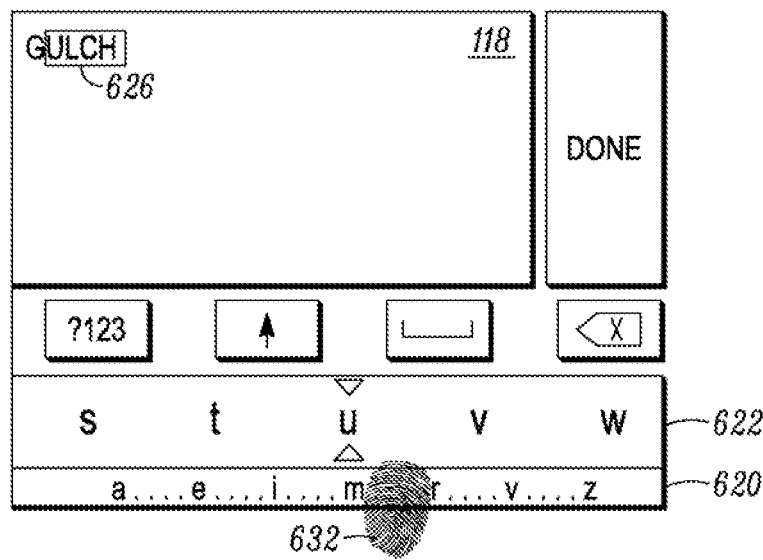
Figure 6E:
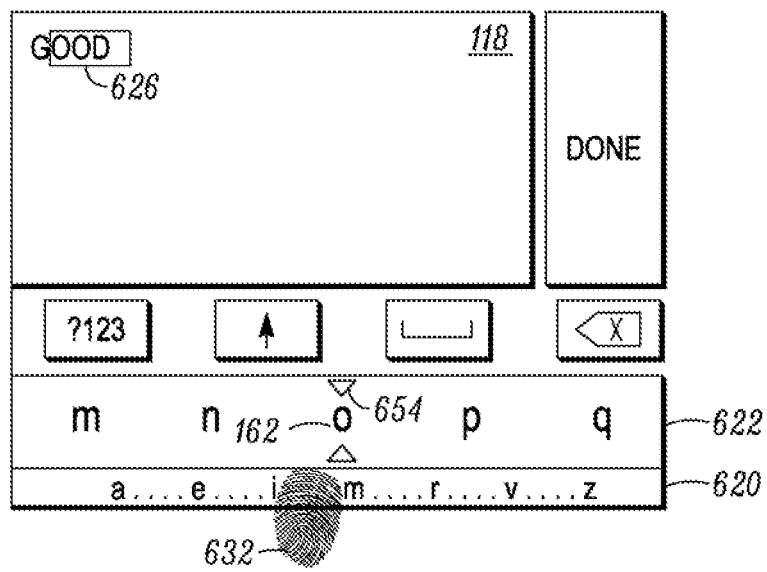
Figure 6F:
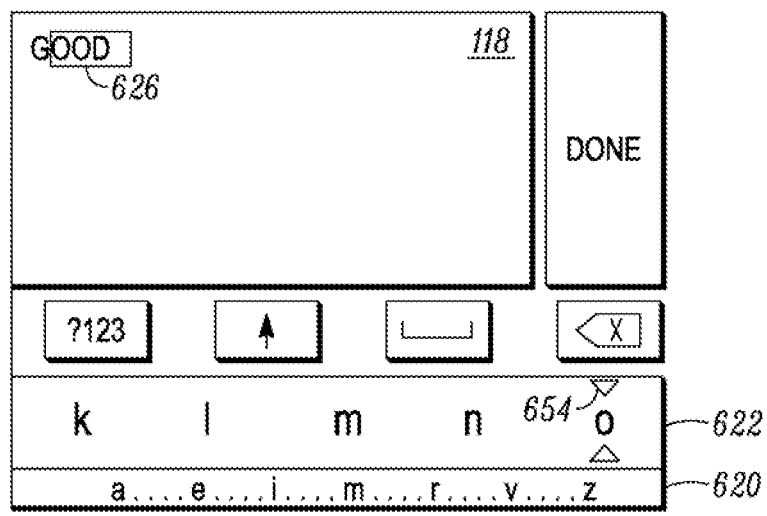

As a result of that action, as shown in FIG. 6C, the prediction engine 160 can cause further updates to the display, including to cause the selection area 622 to display the letters "s t u v w," with the letter "u" highlighted by a highlight mark 654 indicating that letter as the next most-likely letter 162. The prediction engine 160 can also update the whole-word prediction 626 to display the word "Gulch," for convenient selection if that word reflects the user's desired input. After viewing that display, the user may choose, as shown in FIG. 6D, to enter a touch point 632 on the seek area 620 between the letters "m" and "r." In response to that action, as shown in FIG. 6E, the prediction engine 160 can cause the selection area 622 to display the letters "m n o p q," including the letter "o" highlighted by highlight mark 654 as the next most-likely letter 162 within the selected range. Here, the prediction engine 160 provides the highlight mark 654 to set off the letter "o" in the selection area 622 as the next most-likely letter 162, even though the preceding user input action has taken place on the seek area 620 using a touch point 632. The prediction engine 160 can also, in implementations, cause the word "Good" to be displayed at this stage in the text editing box 118, as the whole-word prediction 626, In cases, and as shown in FIG. 6E, the user at this stage may choose to touch a touch point 632 to the left of the letter "m" in the seek area 620, rather than accept or select the next most-likely letter 162. As shown in FIG. 6F, the prediction engine 160 can as a result display the letters "k l m n o" and the letter "o" may remain the next most-likely letter 162, which can be marked off by a highlight mark 652 in the selection area 622. The prediction engine 160 in such cases can effectively shift the five-letter grouping presented in the selection area 622, to include the next most-likely letter 162 at the center point, or in other positions.

It will be appreciated that while certain user input sequences and letter displays are shown in FIGS. 4A-4H, FIGS. 5A-5M, and FIGS. 6A-6F, other inputs, gestures, sequences, and displays can be used or produced by the prediction engine 160 and associated logic.

Figure 7:
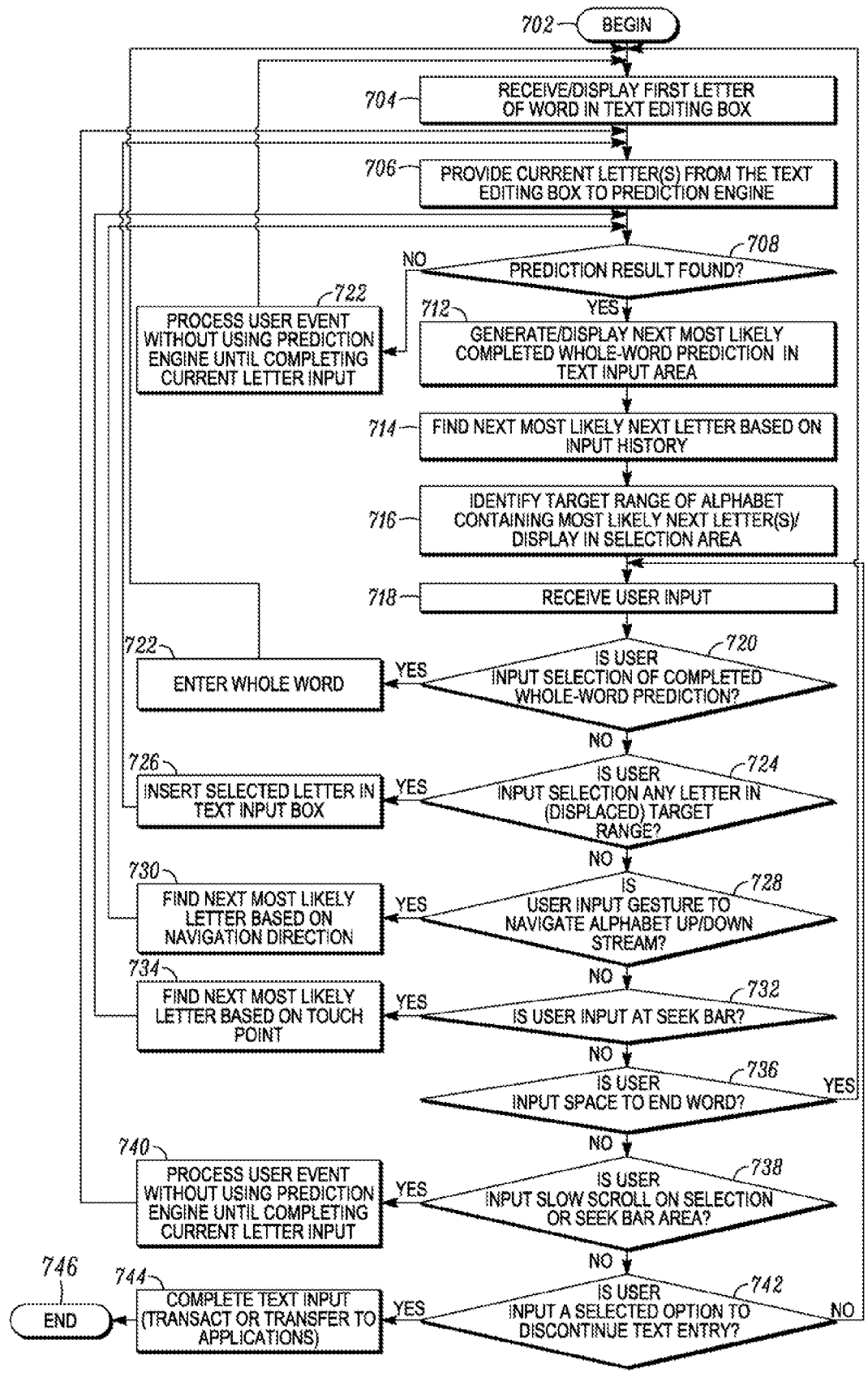
FIG. 7 illustrates processing that can be carried out on an electronic device using systems and methods for predictive text entry for small-screen devices, according to various implementations.

FIG. 7 illustrates prediction logic and other processing that can be used in systems and methods for predictive text entry for small touch-screen devices. In 702, processing can begin. In 704, the two-stage input interface 116 and/or other logic, application, or service, can receive and/or display a first letter of a word in the text editing box 118. The first letter can for instance be captured from user input in the selection area 122 or similar, or can be defaulted or set to a particular letter based on word probability data or other rules. In 706, the current letter(s) can be provided from the text editing box 118 to the prediction engine 160.

In 708, a determination can be made whether the prediction engine 160 can find a prediction result, based on the letters received. If the determination is no, processing can proceed to 710, in which the prediction engine 160 and/or other logic can process the user event or input without using the prediction engine 160 to predict further letters or words, until the current letter input is completed. After 710, processing can return to 704. It may be noted that a special case can be processed for instances where the user may delete a previous letter, in which processing can optionally return to 706, in view of the fact that the prediction engine 160 can be used again with fewer previous letters in the input history.

If the determination in 708 is yes, processing can proceed to 712, in which the prediction engine 160 can optionally generate and/or display a whole-word prediction 126 or similar in the text editing box 118, based on the current letter or letters selected by the user and displayed in the text editing box 118. The completed whole-word prediction 126 can be based on dictionaries, heuristics, look-up tables, self-learning networks, and/or other rules to generate a most likely completed word, based on the letter(s) already selected or inputted by the user.

In 714, the prediction engine 160 can find or generate a most-likely next letter 162 or letters, based on the current letter and/or other input history to that current point. The most-likely next letter can be based on dictionaries, heuristics, look-up tables, self-learning networks, and/or other rules. In 716, the prediction engine 160 can identify a target range 128 of the alphabet containing the most-likely next letter(s), and display that target area 128 in the selection area 122 or similar. The target area 128 generated can, for instance, consist of five consecutive letters of the alphabet, with at least one of those displayed five letters consisting of the letter determined by the prediction engine 160 to be the next most-likely next letter 162, based on the current letter and/or inputted text string to that point. In implementations as described herein, the next most-likely letter 162 can be set off or highlighted with a highlight mark 454 or similar, and/or can be placed in the center of the target range 128 and/or selection area 122 or similar, and/or can be presented, highlighted, and/or positioned in other ways.

In 718, a user input or inputs can be received via the two-stage input interface 118. The user input can include or consist of, for example, a touch on a touch-sensitive screen, a swipe gesture, a selection or confirmation of the entry of a highlighted letter, a spoken or verbal input, and/or other input, action, or event. In 720, a determination can be made whether the user input is a selection of a completed whole-word prediction 426 or similar. If the determination of 720 is yes, processing can proceed to 722 where the whole-word prediction 426 or similar is entered via the text editing box 118. After 722, processing can return to 704. If the determination of 720 is no, processing can proceed to 724. In 724, a determination can be made whether the user input is a selection in a (displaced) target range 128. If the determination of 724 is yes, processing can proceed to 726, in which the selected letter can be inserted in the text editing box 118. After 726, processing can return to 706. If the determination of 724 is no, processing can proceed to 728.

In 728, a determination can be made whether the user input is a gesture to navigate the alphabet or other symbols upstream or downstream. If the determination of 728 is yes, processing can proceed to 730 in which the next most-likely letter 162 can be identified or found based on the navigation direction. After 730, processing can return to 712.

If the determination of 728 is no, processing can proceed to 732. In 732, a determination can be made whether the user input is at, or received from, the seek area 120 or similar. If the determination of 732 is yes, processing can proceed to 734, in which the next most-likely letter 162 can be found or identified based on a touch point 130 or similar. After 734, processing can return to 712. If the determination of 732 is no, processing can proceed to 736.

In 736, a determination can be made whether the user input is a space to end a word. If the determination of 736 is yes, processing can return to 704. If the determination of 736 is no, processing can proceed to 738. In 738, a determination can be made whether the user input is a slow scroll action on the selection area 122 or seek area 120, or similar. If the determination of 738 is yes, processing can proceed to 740, in which the user event or input can be processed without using the prediction engine 160 or other logic until completing the current letter input. After 740, processing can return to 706.

If the determination of 738 is no, processing can proceed to 742. In 742, a determination can be made whether the user input is an option selected to discontinue text entry. If the determination of 742 is no, processing can return to 718. If the determination of 742 is yes, processing can proceed to 744, in which the text input activity can be completed, along with a transfer or transaction of the inputted text to one or more applications or destinations and then the process can be terminated at 746.

It will be appreciated that while various processing activity, logical decisions, and/or other operations illustrated in FIG. 7 or elsewhere have been described as taking place in steps, that two or more of various of those operations or activities can be combined into one operation or activity, and that any one or more of those operations or activities can be divided into two or more operations or activities. Moreover, while those various operations or activities have been illustrated and described as occurring in a certain order, it will be appreciated that in implementations, those same and/or other operations or activities can take place in a different order or orders. It will likewise be understood that indicated reference numbers in connection with the various illustrated steps are intended for reference only, and are not meant to necessarily imply dependencies, precedence, and/or orders between steps, or that steps can not be rearranged or reordered. Further, while various operations or activities have been described as being carried out by certain hardware, software, service, and/or other resources, it will be appreciated that in implementations, the same activities and/or operations can be carried out by other hardware, software, service, and/or other resources, and/or combinations of the same.

It will likewise be appreciated that the foregoing description is illustrative, and variations in configuration and implementation may occur to persons skilled in the art. For example, while embodiments have been described that incorporate a two-stage character input interface 116, in implementations, three or more input stages can be used. Similarly, while implementations have been described in which the electronic device 102 can be or include a portable wireless communications device, in implementations, the operative device can be or include other types or classes of devices or hardware, such as, for example, a data device or hardware incorporated in an automobile having a dashboard or other display screen or area. Further, while embodiments have been described in which the prediction engine 160 generates the most-likely next letter, in implementations, the prediction engine 160 can also or instead generate the most-likely pair of next letters, the most-likely three next letters, the most-likely completed word (as noted), a most-likely entire sentence, and/or other units, sections, increments, or other textual strings or objects. Even further, while embodiments have been described which operate on the English alphabet, in implementations, the prediction engine 160 can operate on the alphabets or symbol sets. Conversely, while implementations have been described which operate solely on the English alphabet, in implementations, prediction processing can be carried using words or letters from two or more languages. Other resources described as singular or integrated can in embodiments be plural or distributed, and resources described as multiple or distributed can in embodiments be combined. The scope of the present disclosure is accordingly intended to be limited only by the following claims.

What is claimed is:

1. A method comprising:
   receiving, by an electronic device, a user input to select a first letter from an alphabet, wherein the alphabet comprises an ordered arrangement of letters that includes a beginning letter and a last letter;
   providing, by the electronic device and for display at a touch-sensitive display, the first letter;
   accessing, by the electronic device, a prediction engine to determine, based on the first letter, a most-likely next letter that is predicted to occur after the first letter in a predicted word;
   providing, by the electronic device and for display in a selection area of the touch-sensitive display, the most-likely next letter in a highlighted position of a first subset of letters of the alphabet, wherein the most-likely next letter is included in the first subset of letters of the alphabet;

after providing the most-likely next letter:
receiving, by the electronic device, an additional user input comprising an indication to refrain from selecting the most-likely next letter and instead to proceed either up the alphabet, towards the beginning letter of the alphabet, or down the alphabet, towards the last letter of the alphabet, with respect to the most-likely next letter;

determining, by the electronic device and based on the additional user input, one of a respective upstream subset of letters of the alphabet or a downstream subset of letters of the alphabet that is different from the first subset of letters of the alphabet;

accessing, by the electronic device, the prediction engine to determine, based on the first letter, a next most-likely next letter that is predicted to occur after the first letter in the predicted word, wherein the next most-likely next letter is different from the most-likely next letter, and wherein the next most-likely next letter is included in the one of the respective upstream subset of letters of the alphabet or the downstream subset of letters of the alphabet;

providing, by the electronic device and for display in the selection area of the touch-sensitive display, the next most-likely next letter in a highlighted position of the one of the respective upstream subset of letters of the alphabet or the downstream subset of letters of the alphabet; and repeating the receiving of the additional user input and the providing of the next most-likely next letter until receiving a further user input to discontinue letter entry.

2. The method of claim 1, wherein the first subset of letters of the alphabet comprises a predetermined range of the alphabet.

3. The method of claim 1, further comprising:
receiving a manual selection of an indication of a range of a further subset of the alphabet without using the prediction engine.

4. The method of claim 3, wherein receiving the manual selection comprises receiving a user selection of a point in a seek area of the touch-sensitive display, and wherein the method further comprises:
providing, for display in the selection area, a second subset of letters of the alphabet associated with the selected point.

5. The method of claim 1, wherein providing the next most-likely next letter in the highlighted position of the respective upstream subset of letters of the alphabet or the downstream subset of letters of the alphabet comprises centering the next most-likely next letter in the respective upstream subset of letters of the alphabet or the downstream subset of letters of the alphabet.

6. The method of claim 1, wherein the indication to refrain from selecting the most-likely next letter and instead to proceed either up the alphabet or down the alphabet comprises a swipe gesture.

7. The method of claim 6, further comprising eliminating a letter as the next most-likely next letter upon determining that the gesture has previously failed to select the letter.

8. The method of claim 6, further comprising pinning the selection area at a beginning of the alphabet or at an end of the alphabet when the swipe gesture reaches the beginning letter or the last letter of the alphabet, respectively.

9. The method of claim 1, further comprising:
generating a predicted completed word for selection in a text input area of the touch-sensitive display based on a current set of selected letters in the predicted word.

10. The method of claim 1, wherein receiving the user input to select the first letter comprises inserting the first letter in a text input area of the touch-sensitive display.

11. A device, comprising:
a touch-sensitive display; and
a processor, coupled to the touch-sensitive display, the processor being configured to:
receive a user input to select a first letter from an alphabet shown in the display, wherein the alphabet comprises an ordered arrangement of letters that includes a beginning letter and a last letter;
provide the first letter for display at the touch-sensitive display;
access a prediction engine to determine, based on the first letter, a most-likely next letter that is predicted to occur after the first letter in a predicted word;
provide, for display in a selection area of the touch-sensitive display, the most-likely next letter in a highlighted position of a first subset of letters of the alphabet, wherein the most-likely next letter is included in the first subset of letters of the alphabet;
after providing the most-likely next letter:
receive an additional user input comprising an indication to refrain from selecting the most-likely next letter and instead to proceed either up the alphabet, towards the beginning letter of the alphabet, or down the alphabet, towards the last letter of the alphabet, with respect to the most-likely next letter;
determine, based on the additional user input, one of a respective upstream subset of letters of the alphabet or a downstream subset of letters of the alphabet that is different from the first subset of letters of the alphabet;
access the prediction engine to determine, based on the first letter, a next most-likely next letter that is predicted to occur after the first letter in the predicted word, wherein the next most-likely next letter is different from the most-likely next letter, and wherein the next most-likely next letter is included in the one of the respective upstream subset of letters of the alphabet or the downstream subset of letters of the alphabet;
provide, for display in the selection area of the touch-sensitive display, the next most-likely next letter in a highlighted position of the one of the respective upstream subset of letters of the alphabet or the downstream subset of letters of the alphabet; and
repeat the receiving of the additional user input and the providing of the next most-likely next letter until receiving a further user input to discontinue letter entry.

12. The device of claim 11, wherein at least one of the user input or additional user input comprises a touch-point input entered on the touch-sensitive display or a swipe gesture entered on the touch-sensitive display.

13. The device of claim 11, wherein the device comprises a wireless transceiver.

* * * * *